United States Patent [19]

Feindt

[11] 3,866,062

[45] Feb. 11, 1975

[54] CIRCUIT ARRANGEMENT FOR SYNCHRONISING OF THE LINE DEFLECTION IN A TELEVISION RECEIVER WITH A SAWTOOTH SIGNAL HAVING CONSTANT MEAN VALUE AND SLOPE

[75] Inventor: Hans-Heinrich Feindt, Schenefeld Kurzer Kamp, Germany

[73] Assignee: U.S. Philips Corporation, New York, N.Y.

[22] Filed: Oct. 2, 1973

[21] Appl. No.: 402,843

Related U.S. Application Data

[63] Continuation of Ser. No. 240,014, March 31, 1972, abandoned.

[30] Foreign Application Priority Data

Apr. 28, 1971 Germany .......................... 2120772

[52] U.S. Cl. ........... 307/228, 315/27 TD, 328/179, 328/185

[51] Int. Cl. ........................................... H03k 4/08

[58] Field of Search ................................ 307/228; 328/181–185, 179; 315/27 TD

[56] References Cited

UNITED STATES PATENTS

| | | | |
|---|---|---|---|
| 3,373,377 | 3/1968 | Townsend | 328/185 |
| 3,569,735 | 3/1971 | Lavender | 328/185 |
| 3,577,007 | 5/1971 | Cross | 328/185 |

*Primary Examiner*—Stanley D. Miller, Jr.
*Attorney, Agent, or Firm*—Frank R. Trifari; Henry I. Steckler

[57] ABSTRACT

A circuit arrangement for generating a sawtooth voltage for synchronising the line deflection in a television receiver. The line flyback pulses are greatly limited and serve to discharge a capacitor. By controlling the edge of the sawtooth occurring during the scan period, its mean value is maintained constant. In cooperation with a phase discriminator horizontal shifts of the image are avoided because the scan remains symmetrical with respect to the centre in case of variations of the duration of the line flyback pulses.

4 Claims, 2 Drawing Figures

CIRCUIT ARRANGEMENT FOR SYNCHRONISING OF THE LINE DEFLECTION IN A TELEVISION RECEIVER WITH A SAWTOOTH SIGNAL HAVING CONSTANT MEAN VALUE AND SLOPE

The invention relates to a circuit arrangement for synchronising the line deflection in a television receiver in which a control voltage is obtained by comparison of the phase position of the received synchronising pulses relative to a sawtooth voltage derived from the line flyback pulses present in the receiver.

In television receivers variations of the line flyback pulses occur in practice, i.e. of the amplitude, the shape (especially when a high voltage transformer cooperating with the line output stage is tuned to a so-called higher harmonic) and the duration thereof. These variations may be caused by tolerances in the transformer, variations of the loads on the line output stage during the occurrence of the pulses and of the load on the high voltage generator. As a result the phase position of the line deflection relative to the received synchronising pulses varies so that the displayed picture is locally shifted horizontally. In principle these shifts may be compensated for.

Such a compensation circuit is, however, not required if the edge of the sawtooth voltage which is compared with the synchronising pulse is always located symmetrically relative to the line flyback pulse. The line scan then remains symmetrical with respect to the display screen. To this end the circuit arrangement according to the invention is characterized in that the amplitude of the line flyback pulses is greatly limited and that during the occurence of the limited pulses a capacitor is discharged which is charged for the rest of the line period so that a sawtooth voltage is produced whose mean value is maintained constant by controlling the charge and/or discharge current.

Figure 1:
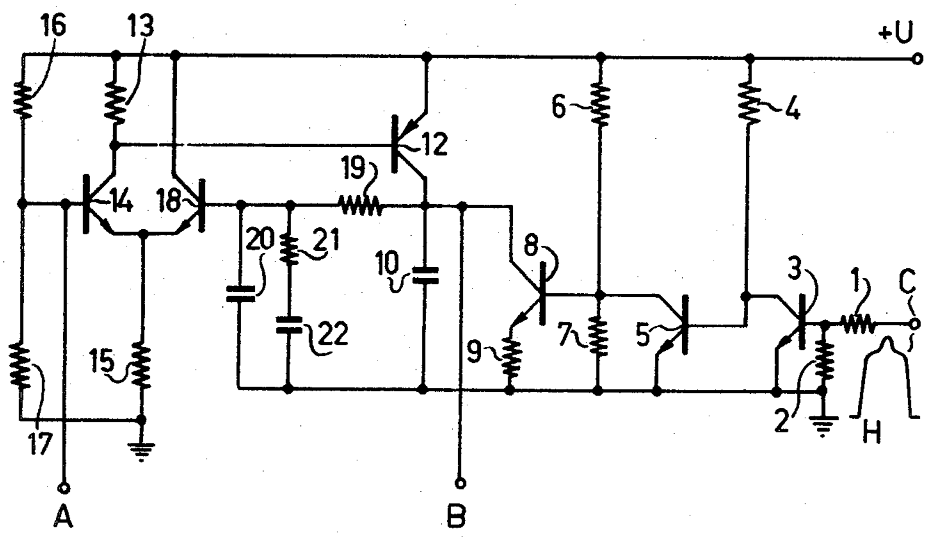
Figure 2:
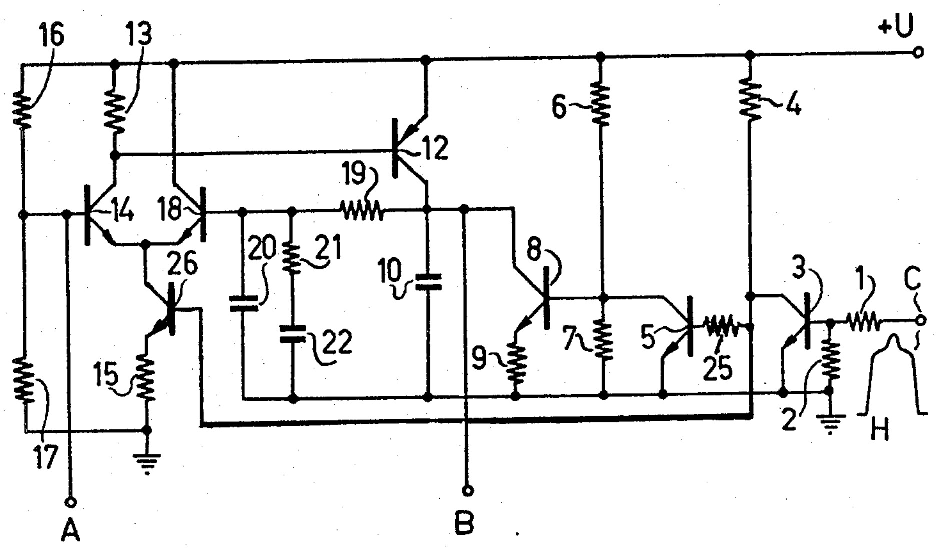

In order that the invention may be readily carried into effect, an embodiment thereof will now be described in detail by way of example with reference to the accompanying diagrammatic drawings in which FIG. 1 is a drawing of a first embodiment of the invention, and FIG. 2 is a drawing of a second embodiment of the invention.

In FIG. 1 a television receiver (not shown) a terminal C receives a positively directed line flyback pulse H whose edges and/or amplitude may be distorted. A potential divider comprising two resistors 1 and 2 is arranged between terminal C and earth and the junction of this divider is connected to the base of an npn-transistor 3. The emitter of transistor 3 is connected to earth. Potential divider 1, 2 is adjusted in such a manner that a small part of the amplitude of pulse H is already sufficient to saturate transistor 3. As a result a strong limitation occurs and the collector current of transistor 3 mainly corresponds to only the lower part of pulse H.

A voltage pulse is produced across the collector resistor 4 of transistor 3, which pulse is applied to the base of an npn-transistor 5 which also acts as a limiter and whose emitter is connected to earth and whose collector is connected to the junction of two resistors 6 and 7 and the base of an npn-transistor 8. Resistors 6 and 7 are arranged in series between the positive terminal of a voltage supply source U and earth, while the negative terminal of source U is connected to earth. The emitter of transistor 8 is connected to earth through a resistor 9 and its collector is connected to earth through a capacitor 10. Resistors 6 and 7 are chosen to be such that capacitor 10 is discharged by a substantially constant current during the period when transistor 5 is cut off during the occurrence of pulse H because transistor 3 is saturated. Consequently, the voltage across capacitor 10 decreases linearly during the flyback period.

Capacitor 10 is also connected to the collector of a pnp transistor 12 whose emitter is connected to the positive terminal of source U and whose base is connected to the collector of an npn-transistor 14. Collector resistor 13 of transistor 14 is connected to the said positive terminal while the emitter resistor 15 thereof is connected to earth and the base is connected to the junction of two resistors 16 and 17 which are arranged in series between the two terminals of source U.

Furthermore the emitter of transistor 14 is connected to the emitter of an npn-transistor 18 whose collector is connected to the positive terminal of source U and whose base is connected through a resistor 19 to capacitor 10. Resistor 19 forms part of a smoothing filter which includes, for example, also the series arrangement of a resistor 21 and a capacitor 22 and a capacitor 20 arranged in parallel thereacross. As a result the mean direct voltage component of the voltage across capacitor 10 is applied to the base of transistor 18. Transistors 14 and 18 constitute a difference amplifier by which the said direct voltage is compared with the voltage at the junction of resistors 16 and 17. The collector current of transistor 14 is the output signal of the difference amplifier, which signal drives the base of transistor 12. This transistor provides a current which charges capacitor 10. This is effected during the scan period when transistor 8 is cut off.

Thus, due to the periodical charging and discharging of capacitor 10 a sawtooth voltage is produced at the non-earthed terminal B thereof and the polarity of this voltage which is applied to a phase comparison stage remains unchanged. In this stage the centre of the edge occurring during discharging of the sawtooth voltage is compared with the synchronising pulse so that the frequency and/or the phase of the line oscillator is readjusted in such a manner that the line deflection constantly maintains a given position in known manner with respect to the synchronising pulse.

If for some reason or other the duration of flyback pulse H varies, the slope of the edge during the flyback period remains constant so that the adjustment of the phase comparison stage and hence the position of the synchronising pulse with respect to the centre of pulse H does not vary. It is true that the duration of the edge at terminal B and hence also the peak-to-peak amplitude of the sawtooth voltage varies. The mean value thereof is, however, maintained constant by means of smoothing filter 19, 20, 21, 22 and transistor 18 so that only the slope of the sawtooth voltage at terminal B will vary during charging of capacitor 10 and this part of the said voltage is not used for phase comparison.

In the circuit arrangement described transistor 12 conducts when capacitor 10 is discharged so that due to its condition the discharge process is slightly influenced. This may be avoided with the aid of the modification shown in FIG. 2. A resistor 25 is arranged between the collector of transistor 3 and the base of transistor 5 while the collector voltage of transistor 3 is applied to the base of an npn-transistor 26, which transistor 26 is arranged between resistor 15 and the emitters of transistors 14 and 18. When pulse H occurs, the collector voltage of transistor 3 assumes a very low value so that both transistor 5 and transistor 26 are cut off. As a result transistors 14, 18 and 12 do not conduct either. Thus, only transistor 8 is in the conducting state during the flyback period and the discharge current of capacitor 10 is determined by this transistor only.

In phase comparison stages not only a reference voltage originating from the line output stage is generally required (in the relevant case a sawtooth voltage having a constant mean value) but also a reference voltage which corresponds to the value of the control voltage for the nominal phase. As a result the phase and therefore the line oscillator are correctly adjusted, for example, when synchronising pulses are absent. In circuit arrangements equipped with vacuum tubes this voltage is often 0 V. Circuit arrangements employing semiconductors, particularly in integrated circuits, require a reference voltage which is between 0 V and the battery voltage (for example, + 7 V employing the Philips type TAA 70). When the direct voltages superimposed on the voltage of the phase comparison stage, i.e., the direct voltage which corresponds to the control voltage 0 V and the direct voltage which is produced when there is no control voltage (for example, when synchronising pulses are absent) are obtained for the battery voltage with the aid of different potential dividers, larger and possibly even inadmissible asymmetries in the circuit arrangement are possible due to the tolerances. As a result the oscillator frequency may vary as far as the non-synchronised state.

An advantage of the circuit arrangement according to the invention is that the mean value at terminal B is determined by the direct voltage at the base of transistor 14 (terminal A), which voltage is available for other uses throughout the period. The above-mentioned tolerances caused by potential dividers are thus eliminated so that the phase comparison stage can be obtained with a minimum of phase tolerances.

What is claimed is:

1. A circuit for producing a sawtooth signal from a television horizontal flyback pulse, said circuit comprising limiting means having an input means for receiving said flyback pulse and an output means for supplying an amplitude limited flyback pulse; a capacitor; and means for producing said sawtooth signal with a substantially constant mean value and flyback period slope regardless of duration changes in said flyback pulse comprising means coupled to said capacitor and said output means for discharging said capacitor during the occurrence of said flyback period and charging said capacitor during the horizontal scanning period.

2. A circuit as claimed in claim 1 wherein said charging and discharging means comprises filter means coupled to said output means for generating a signal having an amplitude in accordance with the mean value of said flyback pulse, a difference amplifier having a first input means coupled to said mean value generator and a second input means for receiving a reference voltage, and a charging transistor coupled to said amplifier and to said capacitor.

3. A circuit as claimed in claim 2 further comprising means coupled to said limiting means for effecting cutoff of said charging transistor during the occurrence of said flyback pulses.

4. A circuit as claimed in claim 2 wherein said difference amplifier comprises a pair of transistors having emitters coupled together, a further transistor having a collector coupled to said emitters, and means coupled to said further transistor and said output means for cutting off said further transistor during the occurrence of said amplitude limited flyback pulse.

* * * * *

UNITED STATES PATENT OFFICE
CERTIFICATE OF CORRECTION

PATENT NO. : 3,866,062
DATED : February 11, 1975
INVENTOR(S) : HANS-HEINRICH FEINDT It is certified that error appears in the above-identified patent and that said Letters Patent are hereby corrected as shown below:

IN THE TITLE PAGE cancel "2120772" and insert -- P.2120772.7 --;

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*